United States Patent [19]

Salinas

[11] 4,399,772

[45] Aug. 23, 1983

[54] ANIMAL FEEDER

[76] Inventor: Rufus C. Salinas, 19321 Ramsey Rd., Crosby, Tex. 77532

[21] Appl. No.: 346,815

[22] Filed: Feb. 8, 1982

[51] Int. Cl.³ ............................ A01K 5/00; A01K 7/00
[52] U.S. Cl. ...................................... 119/51.5; 119/61
[58] Field of Search .................. 119/51.5, 61; D30/16

[56] References Cited
U.S. PATENT DOCUMENTS

| 2,887,988 | 5/1959 | Cottongim | 119/61 X |
| 3,441,003 | 4/1969 | Du Mond et al. | 119/61 |
| 4,128,080 | 12/1978 | Haney | 119/51.5 |

FOREIGN PATENT DOCUMENTS

| 1133174 | 7/1962 | Fed. Rep. of Germany | 119/61 |
| 1344267 | 1/1974 | United Kingdom | 119/61 |

Primary Examiner—Hugh R. Chamblee
Attorney, Agent, or Firm—Michael P. Breston

[57] ABSTRACT

The animal feeder is adapted to protect the feed from insects. It comprises a bowl which, in use, is filled with water. An arm has an upper portion, adapted to support a feed bucket, and a lower portion secured to the bowl. The arm's lower portion, in use, is submerged in the water body contained within the bowl, and the arm's upper portion extends upwardly from the surface of the water.

6 Claims, 5 Drawing Figures

ANIMAL FEEDER

BACKGROUND OF THE INVENTION

1. Field of the Invention

This invention relates to animal feeders and more particularly to such feeders which protect the feed from crawling insects such as ants.

2. Description of the Prior Art

Various animal feeders are commercially available. But, when such feeders are used outdoors, especially in rural areas, for example for feeding dogs, the feed can become quickly infested with crawling insects, typically ants. The spoiled feed will be then rejected by the dog. Such spoiled feed may constitute in the long run a considerable amount of waste and become a source of aggravation for the dog's owner.

It is an object of my invention to provide an animal feeder which can be safely positioned outdoors and in which the feed is fully protected against ground crawling insects.

SUMMARY OF THE INVENTION

The animal feeder is adapted to protect the feed from insects. It comprises a bowl which, in use, is filled with water. An arm has an upper portion, adapted to support a feed bucket, and a lower portion secured to the bowl. The arm's lower portion, in use, is submerged in the water body contained within the bowl, and the arm's upper portion extends upwardly from the surface of the water. Thus, the water body constitutes an effective physical barrier against ground crawling insects which attempt to reach the upper portion of the arm, the bucket supported by the arm, and the feed in the bucket.

DETAILED DESCRIPTION OF PREFERRED EMBODIMENTS

Figure 1:
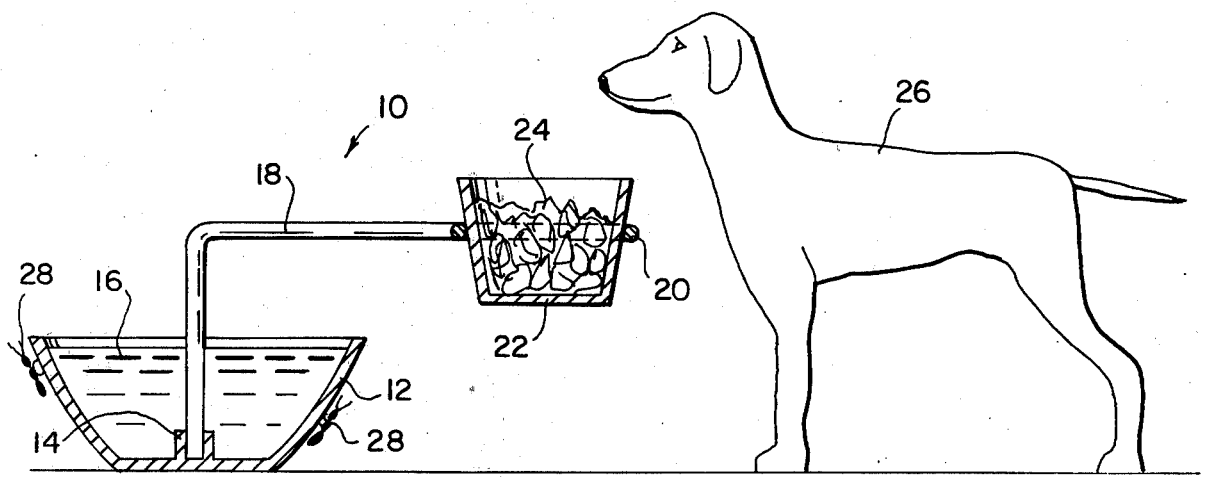
FIG. 1 is a front sectional view of a single-arm embodiment of the feeder of the invention shown in use.

Throughout the drawings the same reference characters are used to designate the same parts. Similar parts are designated with primes.

In FIG. 1 is shown a dog feeder, generally designated as 10, having a bowl 12 on the base of which is a socket 14. Bowl 12 is adapted to contain water 16. Socket 14 receives the lower portion of a bent arm 18 having an outer ring 20 adapted to removably receive therein a bucket 22 which, in use, accepts feed 24 for a dog 26.

Figure 2:
FIG. 2 is a detailed view, partly in section, of an adjustable arm.

The bent arm 18 can consist of a sleeve portion 18b (FIG. 2) which extends into the socket 14 and of a rod portion 18a that is received within the sleeve 18b and is adjustable in height by means of a horizontal pin 30 extending through vertically-spaced apertures 32.

Figure 3:
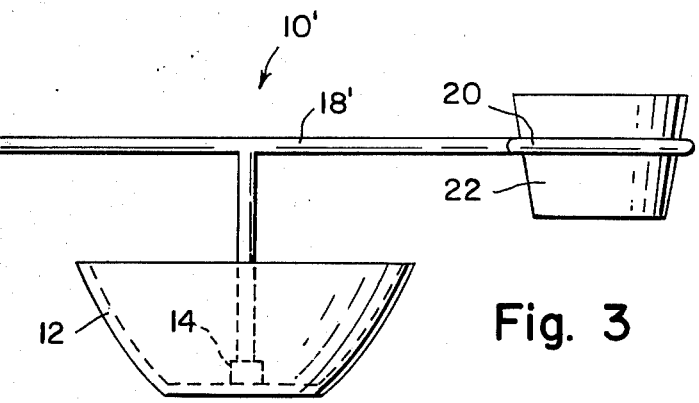
FIG. 3 is a front view of a double-arm embodiment of the invention.

To provide for symmetry of construction and for a more balanced arrangement, the feeder 10', shown in FIG. 3, has a T-shaped arm 18' provided with a pair of diametrically-opposite rings 20 each removably accepting a bucket 22.

Figure 4:
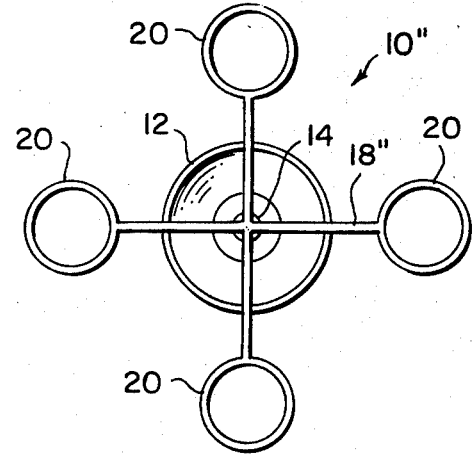
FIG. 4 is a top view of a four-arm embodiment of the invention with the buckets removed for clarity.

In the embodiment 10", shown in FIG. 4, there is provided an arm 18" having four rings 20 circumferentially and equally spaced from each other.

Figure 5:
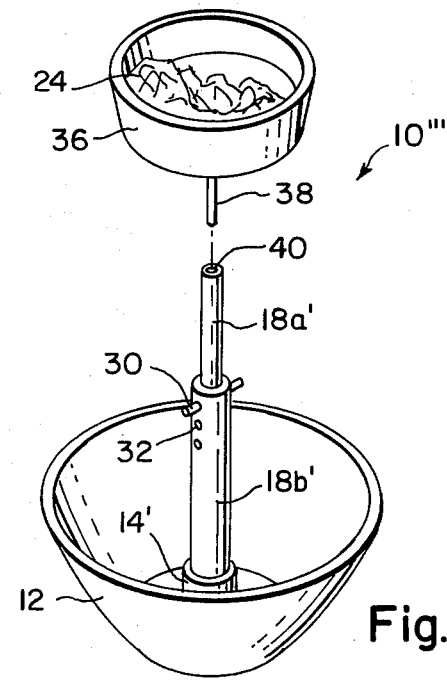
FIG. 5 is an isometric view, partially disassembled, of another embodiment of the invention.

In the embodiment 10''', shown in FIG. 5, the feeder has a socket 14' for accepting a sleeve 18b' adapted to adjustably and telescopically accept a straight tube 18a' having a longitudinal bore 40. A dish 36 is provided with a downwardly-extending center shaft 38 which is slidably received inside bore 40. Tube 18a' is also vertically adjustable by pins 30 extending through vertically-spaced apertures 32.

When the animal feeders 10 of this invention are positioned outdoors, especially in rural areas, the chances are that ground crawling insects, such as ants 28, will attempt to reach the feed 24 in the buckets 22.

In accordance with the invention, the water 16 serves a double purpose, that of providing a liquid for the dog 26 and that of providing a physical barrier against the crawling ants 28. The water 16 prevents the ants 28 from crawling over the arms 18, the rings 20, the buckets 22, and into the feed 24.

In this manner, the feed 24 is protected against spoilage, and the dog owner need not worry that his dog might remain without food.

While this invention has been illustrated only in connection with a dog feeder, it will be apparent that the invention is not limited thereto and that modifications to the invention can be made without departing from the scope of the claims attached hereto.

What I claim is:

1. An animal and pet feeder, comprising:
    a bottom bowl having a base for contacting a ground surface and upwardly-extending side walls to form a reservoir therein for containing a liquid such as drinking water;
    a receptacle centrally disposed within said reservoir of said drinking bowl;
    rod means having a bottom end sized for snug reception within said receptacle and an upper end extending upwardly and laterally from said receptacle by a predetermined horizontal distance;
    support means extending laterally and outwardly from said upper end of said rod means;
    an upper bowl having upwardly-extending side walls to form a reservoir therein for containing a solid such as food, said upper bowl being supported by said support means, whereby said liquid serves as a barrier against insects crawling across said bottom bowl into said upper bowl; and
    said horizontal distance being such that most food particles that may be dropped outside of the side walls of said upper wall from the mouth of the animal, as it is eating the food from the upper bowl, will fall outside of the side walls of said bottom bowl, thereby reduce the water contamination in said bottom bowl which might tend to attract insects therein.

2. The feeder of claim 1, wherein said support means is an annular member.

3. The feeder of claim 1, wherein said rod means is L-shaped.

4. The feeder of claim 3, wherein said support means is an annular member.

5. The feeder of claim 1, wherein said rod means is T-shaped with a pair of diametrically-opposed support means extending outwardly and laterally from the upper end of the leg of said T-shaped rod means; and
    an upper bowl supported by each one of said pair of support means.

6. The feeder of claim 5, wherein each one of said support means is an annular member.

* * * * *